United States Patent
Castellano

(10) Patent No.: US 12,440,251 B2
(45) Date of Patent: Oct. 14, 2025

(54) SMALL BONE INTERNAL FIXATION SYSTEM FOR ORTHOPEDIC SURGERY

(71) Applicant: Bradley David Castellano, Naples, FL (US)

(72) Inventor: Bradley David Castellano, Naples, FL (US)

( * ) Notice: Subject to any disclaimer, the term of this patent is extended or adjusted under 35 U.S.C. 154(b) by 273 days.

(21) Appl. No.: 18/322,747

(22) Filed: May 24, 2023

(65) Prior Publication Data

US 2024/0299069 A1  Sep. 12, 2024

Related U.S. Application Data

(60) Provisional application No. 63/450,866, filed on Mar. 8, 2023.

(51) Int. Cl.
| | | |
|---|---|---|
| *A61B 17/80* | (2006.01) | |
| *A61B 17/88* | (2006.01) | |
| *A61B 17/90* | (2006.01) | |
| A61B 17/56 | (2006.01) | |
| A61B 17/68 | (2006.01) | |

(52) U.S. Cl.
CPC ...... *A61B 17/8004* (2013.01); *A61B 17/8057* (2013.01); *A61B 17/8061* (2013.01); *A61B 17/8897* (2013.01); *A61B 17/90* (2021.08); A61B 2017/565 (2013.01); A61B 2017/681 (2013.01)

(58) Field of Classification Search
CPC ............ A61B 17/8804; A61B 17/8061; A61B 17/8897; A61B 2017/681; A61B 17/90
See application file for complete search history.

(56) References Cited

U.S. PATENT DOCUMENTS

| | | | | |
|---|---|---|---|---|
| 7,744,638 B2* | 6/2010 | Orbay | ............... | A61B 17/8061 606/280 |
| 7,988,691 B2* | 8/2011 | Schulze | ............. | A61B 17/8023 606/71 |
| 8,496,665 B2* | 7/2013 | Cavallazzi | ........... | A61B 17/808 408/241 B |
| 9,211,148 B2* | 12/2015 | Stevenson | ............. | A61F 2/2846 |
| 9,949,744 B2* | 4/2018 | McCormick | ........ | A61B 17/8061 |
| 10,258,351 B2* | 4/2019 | Biedermann | ...... | A61B 17/1728 |
| 10,307,153 B2* | 6/2019 | Nordmeyer | ........ | A61B 17/8894 |
| 10,517,655 B2* | 12/2019 | Lundquist | .......... | A61B 17/8061 |
| 10,603,090 B2* | 3/2020 | Orbay | ............... | A61B 17/8085 |
| 10,682,168 B2* | 6/2020 | Kay | .................... | A61B 17/8061 |
| 11,331,128 B2* | 5/2022 | Zingalis | ............. | A61B 17/1633 |
| 11,452,549 B2* | 9/2022 | Suh | ..................... | A61B 17/7071 |

(Continued)

*Primary Examiner* — Anu Ramana
(74) *Attorney, Agent, or Firm* — Adrian D. Battison; Ade & Company Inc.; Ryan W. Dupuis

(57) ABSTRACT

A small bone internal fixation system for orthopedic surgery is disclosed. This includes a fixation plate which is fixated to the bone before making the osteotomy cut of the head from the bone and can act as a cut guide for the cutting action. A buttress portion on a side of the fixation plate provides a front buttress surface which acts as the cutting guide and locates the translational movement of the cut head so as to prevent the metatarsal or metacarpal bone head from swiveling as it translates and allows for an easy method of temporarily and then permanently fixating the metatarsal or metacarpal head using firstly a wire guide and then a screw guided by the wire which fastens the bone head to the buttress portion.

17 Claims, 13 Drawing Sheets

(56) References Cited

U.S. PATENT DOCUMENTS

| | | | |
|---|---|---|---|
| 2005/0234467 A1* | 10/2005 | Rains | A61B 17/1735 |
| | | | 606/96 |
| 2006/0089648 A1* | 4/2006 | Masini | A61B 17/1615 |
| | | | 606/291 |
| 2008/0015591 A1* | 1/2008 | Castaneda | A61B 17/1728 |
| | | | 606/86 A |
| 2009/0228048 A1* | 9/2009 | Duncan | A61B 17/1782 |
| | | | 606/280 |
| 2015/0223824 A1* | 8/2015 | Mebarak | A61B 17/1728 |
| | | | 606/87 |
| 2016/0095633 A1* | 4/2016 | Stevenson | A61B 17/7071 |
| | | | 606/280 |
| 2017/0196602 A1* | 7/2017 | Lundquist | A61B 17/8061 |
| 2020/0261128 A1 | 8/2020 | Kay et al. | |
| 2021/0330335 A1 | 10/2021 | Boffeli et al. | |
| 2022/0226029 A1 | 7/2022 | Heavener et al. | |
| 2022/0361894 A1 | 11/2022 | Woodard et al. | |
| 2022/0370105 A1* | 11/2022 | Detweiler | A61B 17/808 |
| 2023/0104559 A1 | 4/2023 | Cowan et al. | |

* cited by examiner

SMALL BONE INTERNAL FIXATION SYSTEM FOR ORTHOPEDIC SURGERY

This invention relates to a fixation device and set of components which can be used in a method for locating the bone head when separated from the bone length to accurately locate the bone head relative to the bone length during orthopedic surgery.

This arrangement is primarily proposed for use with metatarsal osteotomy designed to move a metatarsal or metacarpal bone transversely. This process is difficult to fixate with presently available plate and screw fixation methods. This includes bunion and tailor bunion deformities and other less frequent deformities of long bones. This plate system may also be helpful in temporal mandibular deformities or other conditions with the end of a bone or bone head needing transposition or offset relative to the bone length to achieve the necessary position and thus is not limited to use with metatarsals.

The arrangement herein may be described for convenience in terms which indicate a particular orientation but it will be appreciated that these directions are used only for convenience and the orientation of the device can of course be changed to suit the orientation of the bones to which it is attached so that it is not limited to any particular orientation in use.

SUMMARY OF THE INVENTION

Metatarsus adductus, in particular, has been a vexing problem for foot surgeons of all skill levels. The arrangement described herein thus provides a simple and effective method for reconstructing this complex deformity.

Many L-shaped bone fixation plates already exist that can prevent the metatarsal head from swiveling when the head is positioned offset. However a screw must be inserted through the plate from dorsal to plantar into the metatarsal head. The plate must be applied after making the osteotomy. In this case, applying the plate to bone obscures the surgeon's vision of the construct both visually and radiographically. The plate is also then in the way of allowing the head to be manipulated into position. The method and device we propose allows the plate to be applied to the bone first, followed by cutting the bone.

This new fixation plate can be fixated to the bone before making the osteotomy and even acts as a cut guide. The buttress on the side of the plate prevents the metatarsal or metacarpal head from swiveling and allows for an easy method of temporarily and then permanently fixating the metatarsal or metacarpal head without obscuring the surgeon's visualization of the osteotomy and position of the metatarsal head.

According to the invention therefore there is provided a fixation device for use in osteotomy of a bone having an elongate bone length and a bone head at one end of the bone length where the osteotomy is used to separate the bone head from the bone length at a division line, the device comprising:

a unitary member having:
    an elongate plate portion arranged for attachment to the elongate bone length and extending in a longitudinal direction along the bone length from a first end to be located remote from the bone head to a second end to be located at the bone head;
    the elongate plate portion having two side edges, an upper surface and a lower surface;
    at least two holes through the elongate plate portion from the upper surface to the lower surface and between the side edges, said at least two holes being arranged to receive fasteners passing through the elongate plate portion from the upper surface for fastening the lower surface of the elongate plate portion to the elongate bone length;
    a buttress portion connected to the elongate plate portion at the second end extending transverse to the elongate plate portion to provide a part of the buttress portion projecting outwardly beyond one side edge of the elongate plate portion;
    the buttress portion having a front buttress surface facing away from the elongate plate portion and a rear surface facing along the elongate plate portion;
    at least one hole through the part of the buttress portion from the rear surface to the front buttress surface, said at least one hole being arranged to receive at least one fastener passing through the part of the buttress position from the rear surface for fastening the front buttress surface of the buttress portion to the bone head after the osteotomy;
    the front buttress surface lying transverse to the longitudinal direction and forming a front most surface of the unitary member by which the division line of the bone head is supported and located by the front buttress surface for translocation thereon.

Preferably the front buttress surface is planar so as to provide a common plane for guiding the cutting plane and for translating the bone head across the longitudinal axis. However, the surface may be slightly convex if used only for guiding the movement. Preferably the surface is at right angles to the longitudinal direction However a small angle to the longitudinal axis may be used in some circumstances so as to move the bone head longitudinally of the bone length while being moved transversely.

Preferably the front buttress surface extends outwardly beyond one side edge of the elongate plate portion and downwardly beyond the lower surface. This provides a location for accessing the screw fastener alongside or generally parallel to the plate portion during the fixation to the bone head.

Preferably the buttress portion is offset wholly to one side of the elongate plate portion so that it does not extend past the other side edge. This allows the bone head to be translated across the bone length without any projection to the recessed side.

Preferably the buttress portion is offset below the elongate plate portion so that it does not extend substantially past the upper surface.

Preferably the front buttress surface forms a flange of substantially constant thickness in the longitudinal direction. This best presents the hole for the fixation screw to be accessed in a direction generally parallel to the plate portion.

Preferably the hole in the buttress portion is threaded to receive a male thread of a screw guide. In this way the screw guide can be located directly on the axis of the hole and provide a tubular guide surface to direct a guide wire to the interior of the bone head to ensure proper location of the bone head on the fixation device and proper location of the wire in the bone head. The tubular guide can include a depth measurement guide to ensure that the wire is inserted to the required depth in the bone head. The tubular guide can then be removed leaving the wire in place while guiding the location of a screw fastener by applying a fastener with an internal bore over the wire to the required location and then by withdrawing the wire when the screw is properly located.

The buttress portion can include a single hole for receiving the screw attachment to the now relocated bone head. However, it may include two or more holes for increased engagement force and prevent frontal plane rotation of the head of the bone being fixated.

Typically, the elongate plate portion has two fastening holes to ensure that alignment is maintained but, in some cases, a third hole can be provided adjacent the buttress portion and this may be inclined through the elongate plate portion toward the buttress portion so as pass through the buttress portion and into the bone head for increased attachment.

According to a second aspect of the invention there is provided a set of components for use in osteotomy of a bone having an elongate bone length and a bone head at one end of the bone length where the osteotomy is used to separate the bone head from the bone length at a division line, the set of components comprising:
- a fixation device as defined above;
- a plurality of screw fasteners for fastening the elongate plate portion to the bone length;
- a screw fastener for fastening the buttress portion to the bone head, the screw fastener including a central hole allowing the screw fastener to pass over a guide wire; and
- a guide tube for engagement with the hole in the buttress portion to receive a guide wire therethrough.

Preferably the guide tube has a male thread for engaging into a female thread in the hole in the buttress portion of the plate so as to properly align the guide tube axial of the hole to receive a guide wire and subsequently a fastening screw which is located and guided by the guide wire.

The set of components for carrying out this procedure can also include a paddle holder having a mounting portion for attachment to the elongate plate portion and a blade portion with a plurality of adjustment holes for attachment of the blade portion to a side of the bone head for positioning of the bone head on the front buttress surface.

According to a third aspect of the invention there is provided method for osteotomy of a bone having an elongate bone length and a bone head at one end of the bone length where the osteotomy is used to separate the bone head from the bone length at a division line, the method comprising:
- attaching to the elongate bone length by fasteners an elongate plate portion extending in a longitudinal direction along the bone length from a first end to be located remote from the bone head to a second end at the bone head;
- the elongate plate portion having two side edges, an upper surface and a lower surface engaging the bone length;
- locating a buttress portion connected to the elongate plate portion at the second end extending transverse to the elongate plate portion;
- the buttress portion having a front buttress surface facing away from the elongate plate portion and a rear surface facing along the elongate plate portion;
- using the front buttress surface as a guide, cutting through the bone to separate the bone length from the bone head;
- translating the bone head across the front buttress surface to a required offset location of the bone head relative to the bone length;
- and fastening the front buttress surface of the buttress portion to the bone head at the required offset location.

Preferably the front buttress surface is planar to guide the translating of the bone head.

In some cases, the bone head can be rotated about an axis longitudinal of the bone while guided on the front buttress surface. In this way the buttress surface acts to locate the bone head in two directions and angularly to provide the best repositioning of the head relative to the bone length when positioned.

In many cases there is provided a tubular screw guide which is located in a guide hole on the buttress portion and a fastening screw is guided through the hole buttress portion on a guide wire to a required position in the bone head. This can guide the wire both transversely and in depth using a depth gauge in the tubular guide.

The arrangement herein thus provides the buttress portion on the side of the elongate plate which prevents the bone head from swiveling and allows for an easy method of temporarily and then permanently fixating the bone head.

As stated above, osteotomies designed to move a metatarsal or metacarpal bone transversely are difficult to fixate with presently available plate and screw fixation methods that are currently available. This includes bunion and tailor bunion deformities and other less frequent deformities of long bones. This plate system may also be helpful in temporal mandibular deformities or other conditions with the end of a bone needing to be transposed or offset to achieve the necessary position. The invention claimed here solves this problem.

The new plate fixation system herein has an offset buttress that acts to support the metatarsal or metacarpal head that has been translocated. The buttress will accept one or more screws, resulting in excellent stability.

The claimed invention differs from what currently exists. Metatarsal or metacarpal fixation systems do not supply a buttress to prevent the metatarsal or metacarpal head rotation. The buttress plate in the present system prevents unwanted rotation of the bone end but also easily allows for desired rotation before fixation.

Existing bone plating systems require the bone to be cut first and then fixated. The small size of the metatarsal or metacarpal bone and the confinement of the surgical site makes temporary fixation difficult, and frequently the desired position of the fixated bone is lost during the process. This results in the need to remove the screw and reposition it before attempting to fixate the second time. As more holes are made in the metatarsal head, the stability can become compromised due to a lack of screw purchase.

This new fixation plate can be fixated to the bone before making the osteotomy and even acts as a cut guide. The buttress on the side of the plate prevents the metatarsal or metacarpal head from swiveling and allows for an easy method of temporarily and then permanently fixating the metatarsal or metacarpal head.

Various methods and configurations of osteotomies have been used to correct osseous deformities such as hallux valgus. However, a simple transverse cut through a bone allows multiplanar correction, i.e., transverse plane transposition and frontal plane rotation. Since the buttress plate (1) is applied to the bone first, the osteotomy has created the need for cumbersome temporary fixation that interferes with the application of the plate is alleviated.

BRIEF DESCRIPTION OF THE DRAWINGS

Embodiments of the invention will now be described in conjunction with the accompanying drawings in which.

DETAILED DESCRIPTION

Figure 2:
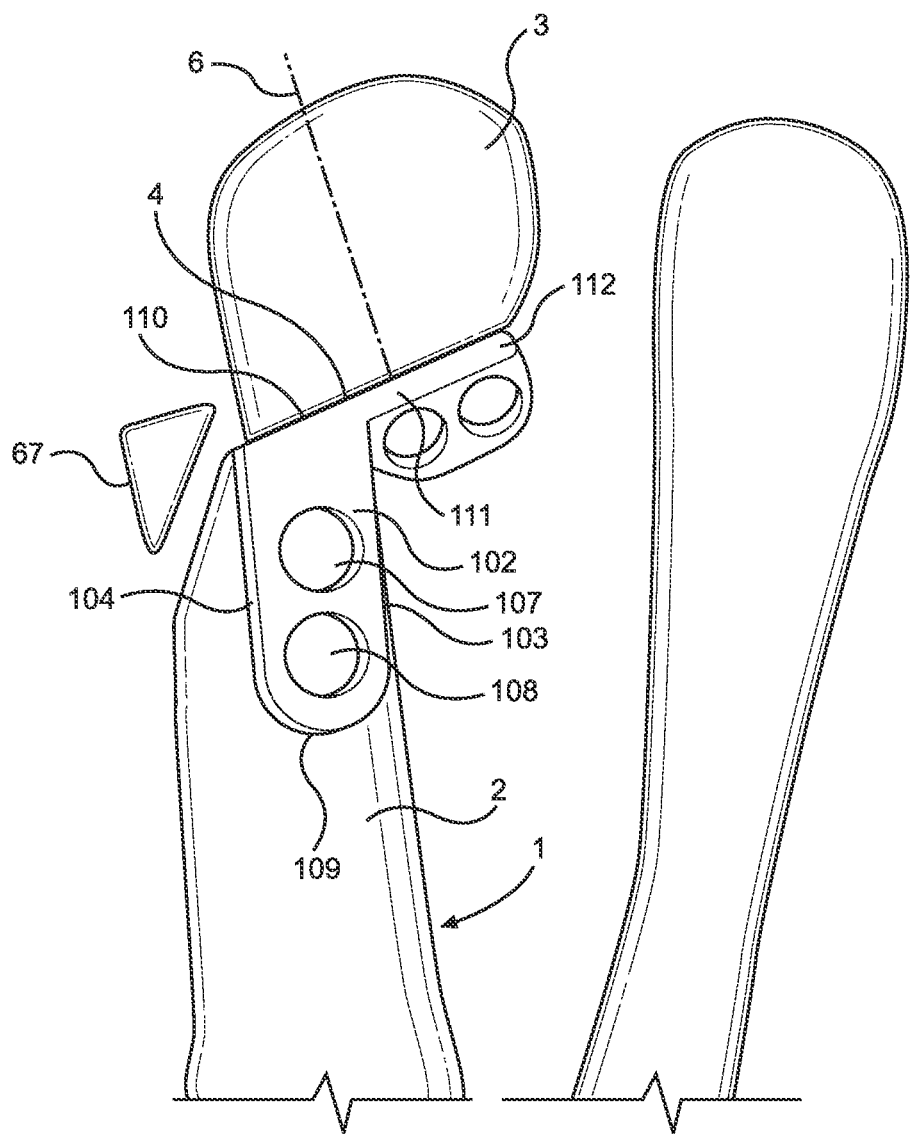
FIG. 2 is an enlarged view of one metatarsal FIG. 1.

In osteotomy of a bone as shown in FIG. 2, such as a first metatarsal, the bone 1 has an elongate bone length or body 2 and a bone head 3 at one end of the bone length, where the osteotomy is used to separate the bone head from the bone length at a division or cut line 4.

It is then necessary to reset the bone head 3 on the bone length 2 at a required location and orientation to provide the planned modification of bone structure to achieve the required medical result. As shown in FIG. 2 the head 3 is offset to one side of the bone length 2 at the cut line 4 so as to be moved laterally. The bone head can also be rotated about an axis 6 so as to change the position of the outer surface of the bone head relative to the bone length to obtain known medical effects.

Figure 19:
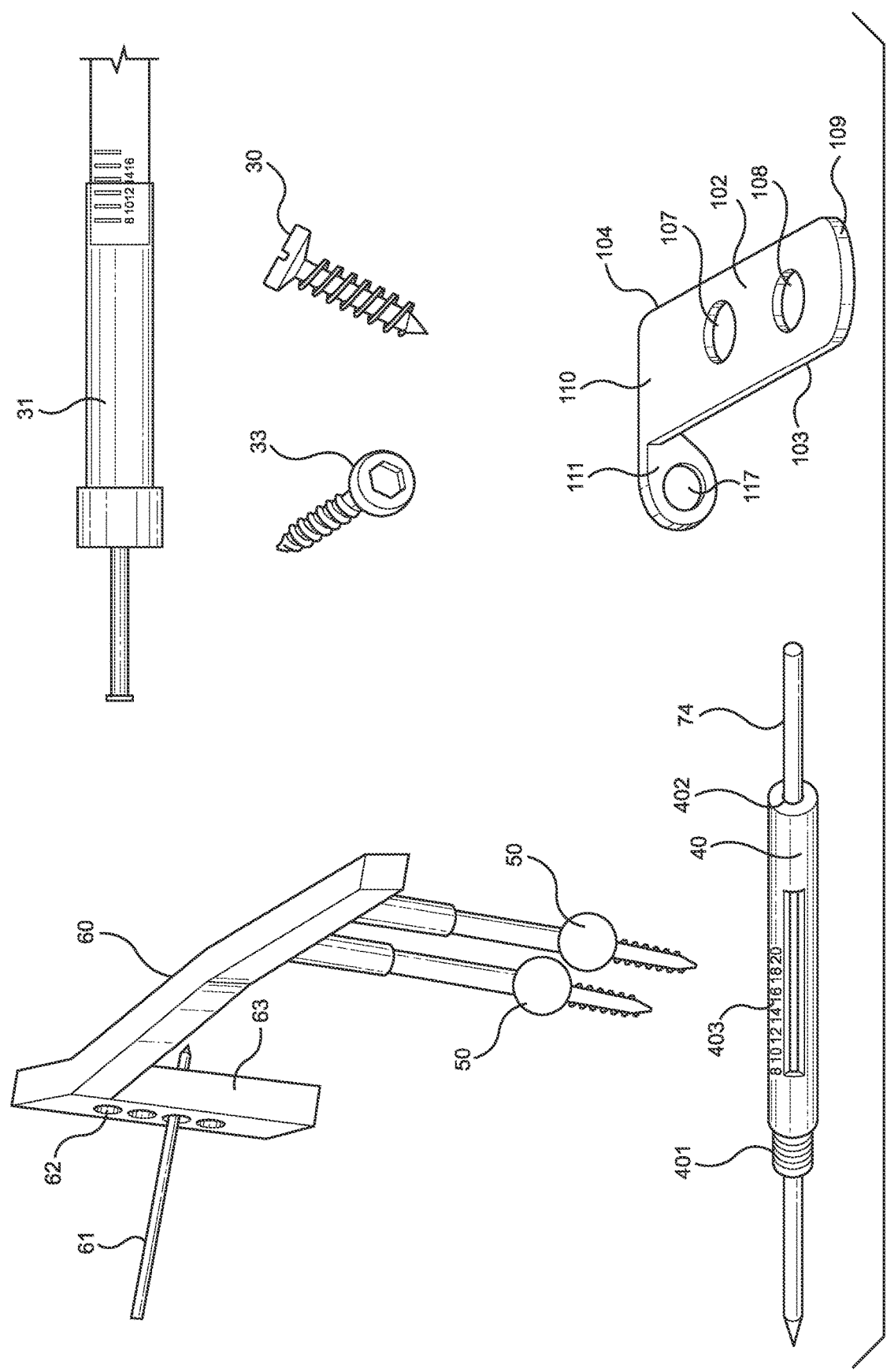
FIG. 19 shows the set of parts used in the method including the fixation device of FIGS. 1 to 10, the guide tube for the guide wire, the fixation screw with a central bore to pass along the guide wires a tack for temporary fasting to the bone and a paddle shaped holder to locate the position of the bone head relative to the bone length.

A set of components for use in the osteotomy and subsequent correction is shown in FIG. 19 and includes:
- a fixation device 10 as described in more detail hereinafter;
- a plurality of screw fasteners 30 for fastening the fixation device 10 to the bone length;
- a further screw fastener 30 for fastening the fixation device 10 to the bone head, the screw fastener including a central hole allowing the screw fastener to pass over a guide wire;
- a guide tube 40 for engagement with a hole in the fixation device 10 to receive the guide wire therethrough;
- a plurality of tacks 50 for temporary attachment of the fixation device 10 to the bone length;
- a paddle holder 60 having a mounting portion for attachment to the fixation device 10 to the bone length and a blade portion with a plurality of adjustment holes for attachment of the blade portion to a side of the bone head for positioning of the bone head.

The fixation device 10 is formed as a unitary member or body 101 having an elongate plate portion 102 arranged for attachment to the elongate bone length and extending in a longitudinal direction along the bone length from a first end 109 to be located remote from the bone head to a second end 110 to be located at the bone head. The elongate plate portion 102 has two side edges 103, 104, an upper surface 105 and a lower surface 106. The plate portion has a width and length sufficient to provide a secure attachment to the bone length and to transfer the required forces as discussed hereinafter. The plate portion is typically arched across its width so as to engage around the curvature of the bone. The radius of curvature can be selected to match the intended bone to be operated upon so that different sizes can be provided if required for different bones, or the curvature can be selected to reasonably match all.

The plate portion 102 has two holes 107, 108 through the elongate plate portion from the upper surface to the lower surface and located spaced inwardly from the side edges arranged to receive fasteners passing through the elongate plate portion downwardly from the upper surface for fastening the lower surface 106 of the elongate plate portion to the top of the elongate bone length. This is done firstly using the temporary tacks 50 to hold the fixation device in place during initial steps and they the tacks are replaced by the fixation screws when the location is properly determined, as set out in the steps of the method set out below.

At the second end 110 is provided a buttress portion 111 connected to the elongate plate portion 102 at the second end extending transverse to the elongate plate portion 102 to provide a part 112 of the buttress portion projecting outwardly beyond one side edge 103 of the elongate plate portion 102.

Figure 3:
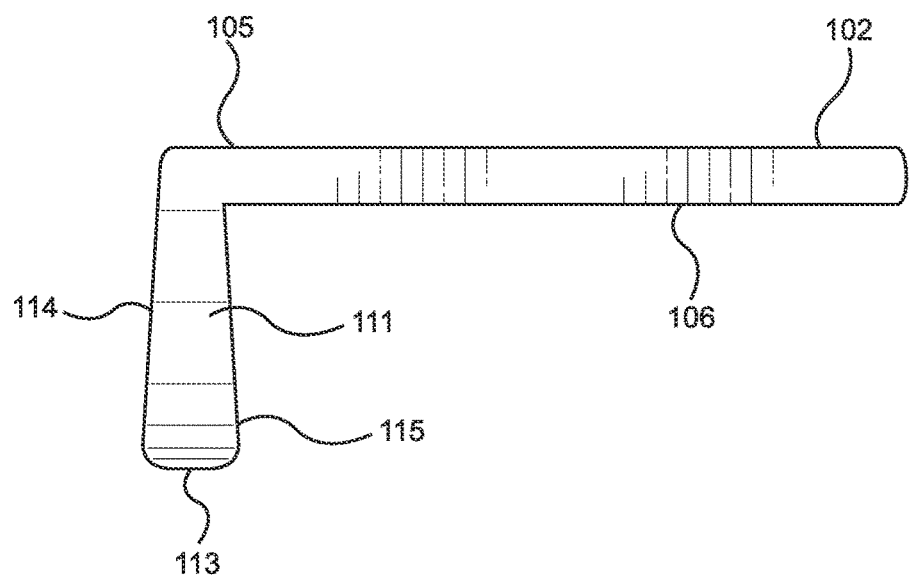
FIGS. 3 to 10 are side, top, rear, front, bottom, other side, first isometric and second isometric views of one embodiment of the fixation device itself.
Figure 4:
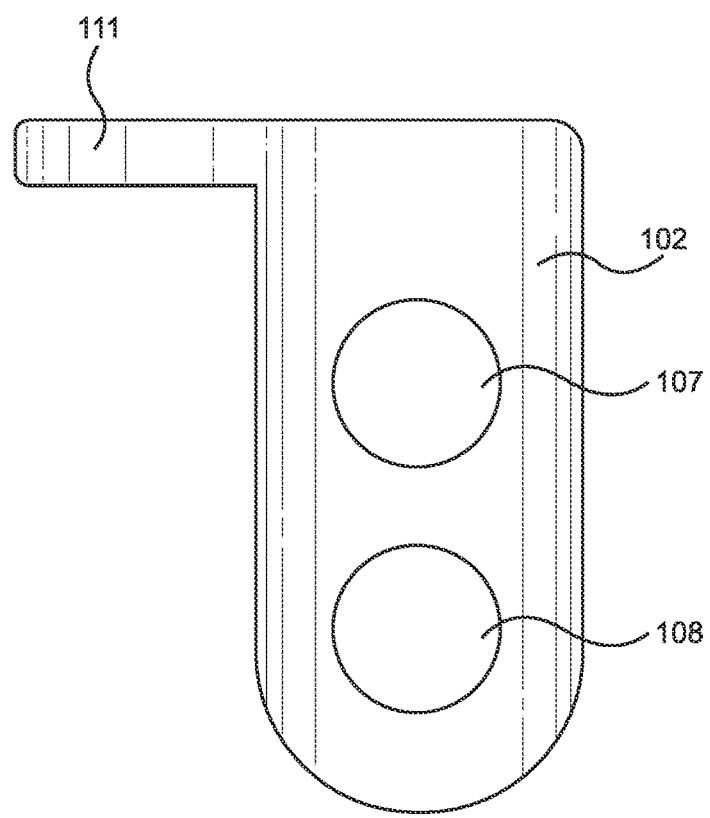
Figure 5:
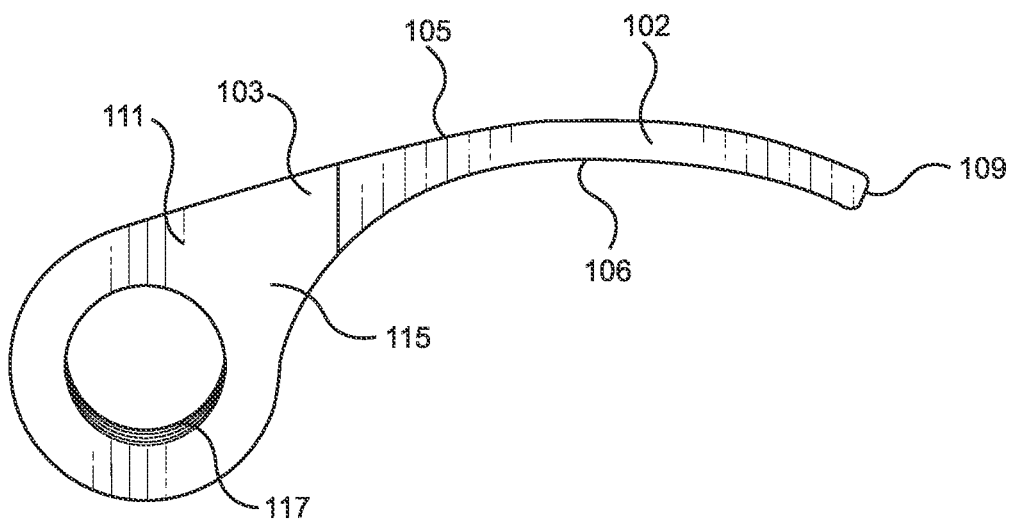
Figure 6:
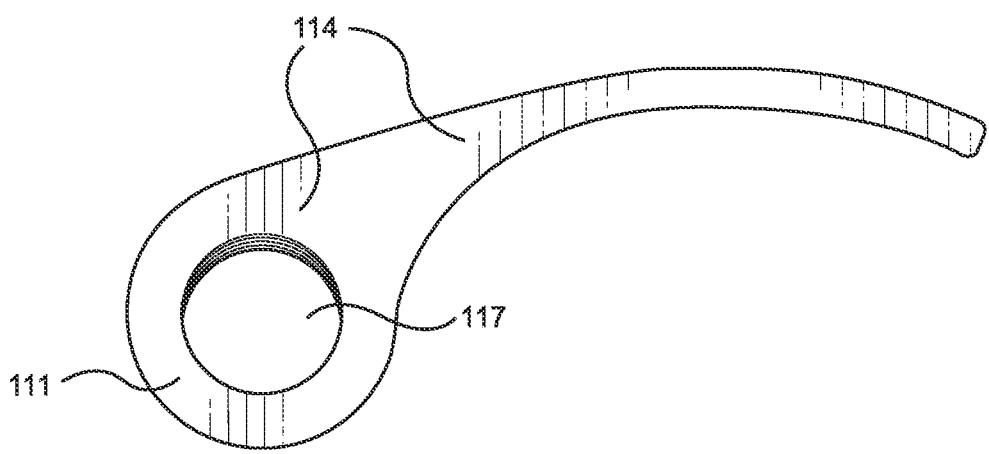
Figure 7:
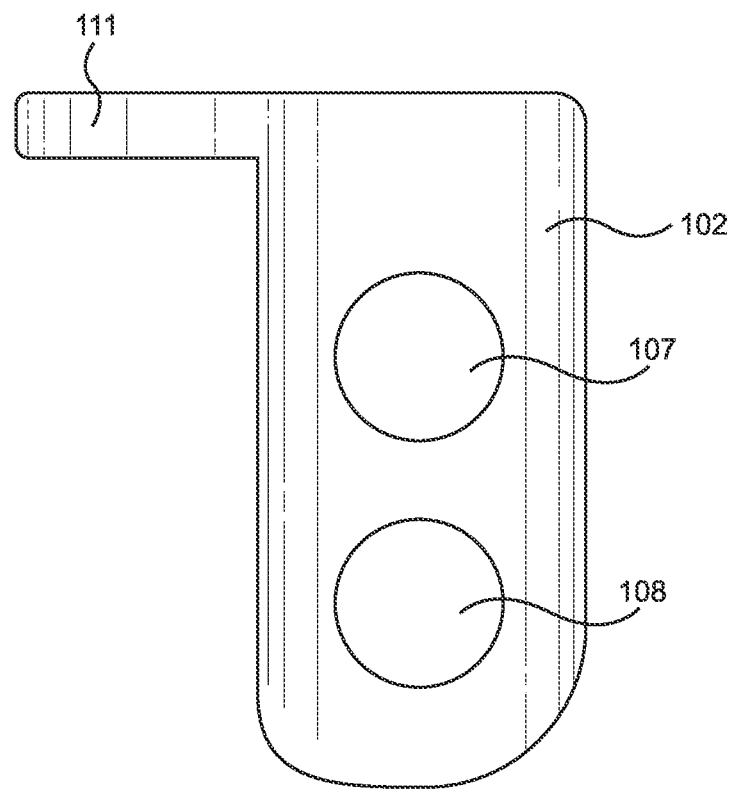
Figure 8:
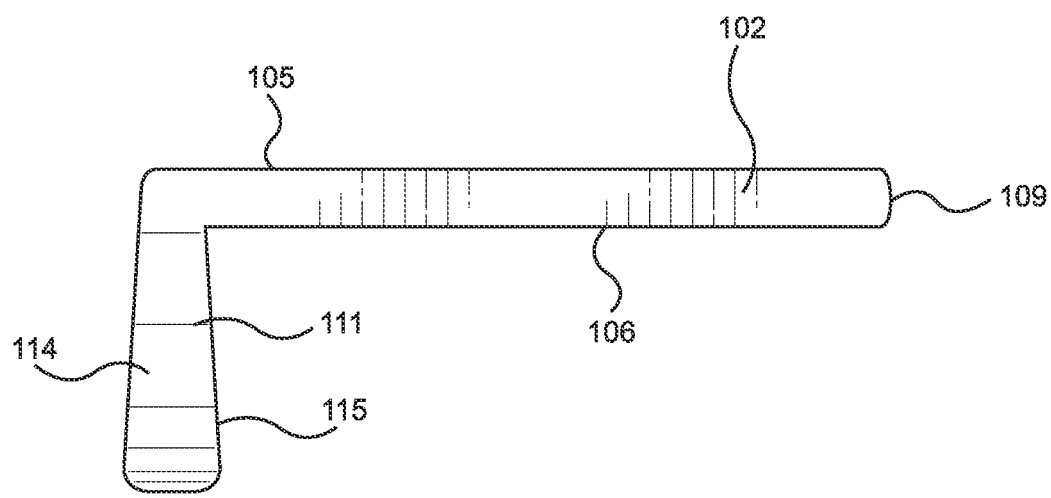
Figure 9:
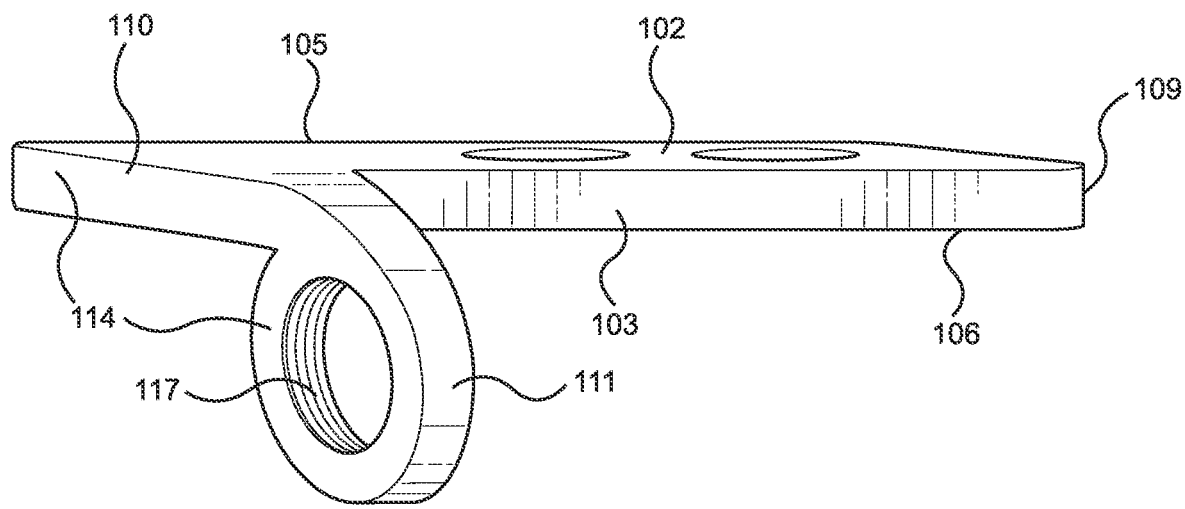
Figure 10:
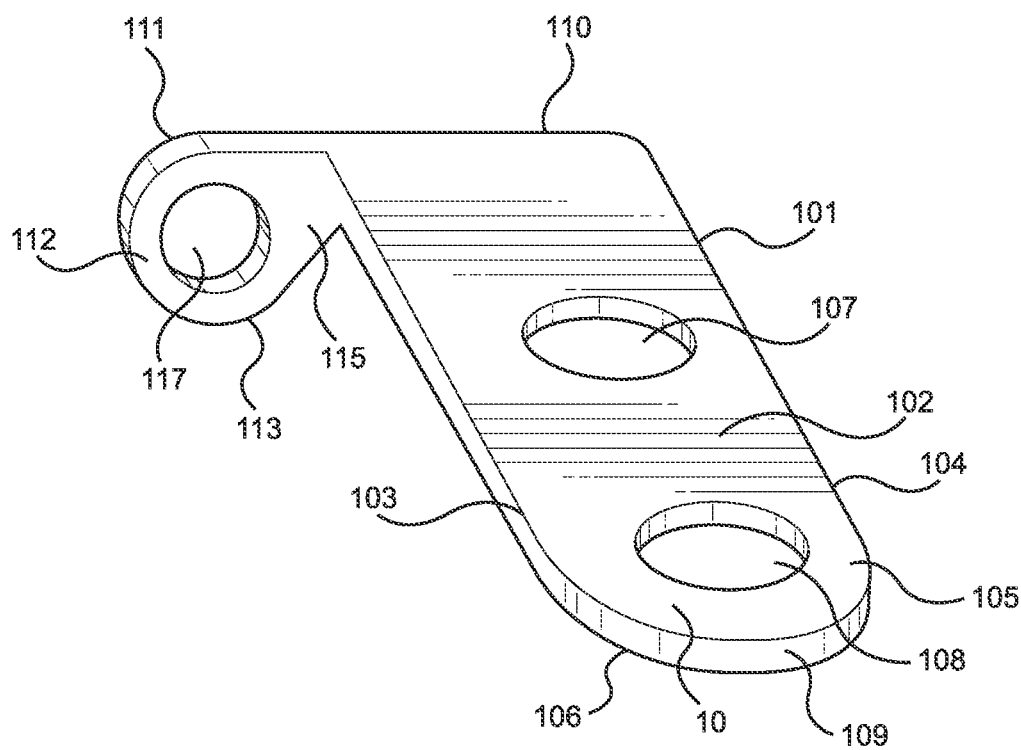

The buttress portion 111 defines in effect a flange of generally constant thickness which projects outwardly from the side edge 103 and downwardly from the lower surface 106. As shown in FIG. 3, the flange can increase in thickness from its top at the plate 102 to a bottom edge 113 remote from the plate 102. The flange does not project upwardly from the upper surface 105 or beyond the other side edge 104. The flange is thus generally confined to one area underneath the lower surface and outwardly from the side edge. The buttress portion has a front buttress surface 114 facing away from the elongate plate portion 102 and a rear surface 115 facing along the elongate plate portion. The buttress portion has a hole 117 through the part of the buttress portion from the rear surface 115 to the front buttress surface 114 arranged to receive at least one fastener passing through the buttress portion from the rear surface for fastening the front buttress surface of the buttress portion to the bone head after the osteotomy. The hole 117 in the buttress portion is threaded to receive a male thread of the screw guide and depth gauge 40 as described below.

The front buttress surface 114 lies transverse to the longitudinal direction and forms a front most surface of the unitary member 101. This surface 114 is generally flat or planar and forms a guide surface by which the division line or cut plane of the bone head after cutting is supported and located by the front buttress surface for translocation thereon.

Figure 15:
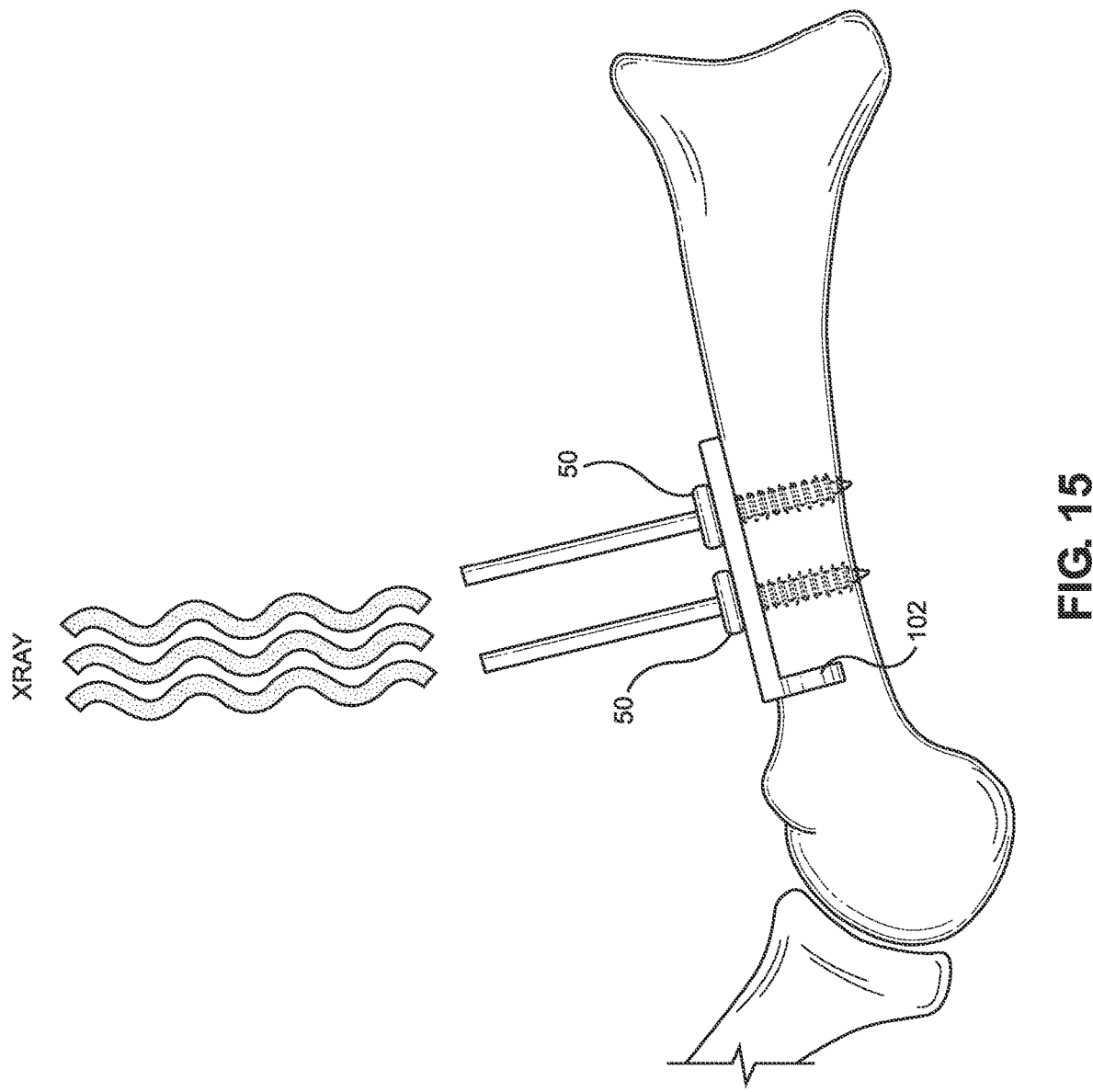
FIGS. 15, 16, 17 and 18 show four steps in the method of use of the fixation device.
Figure 16:
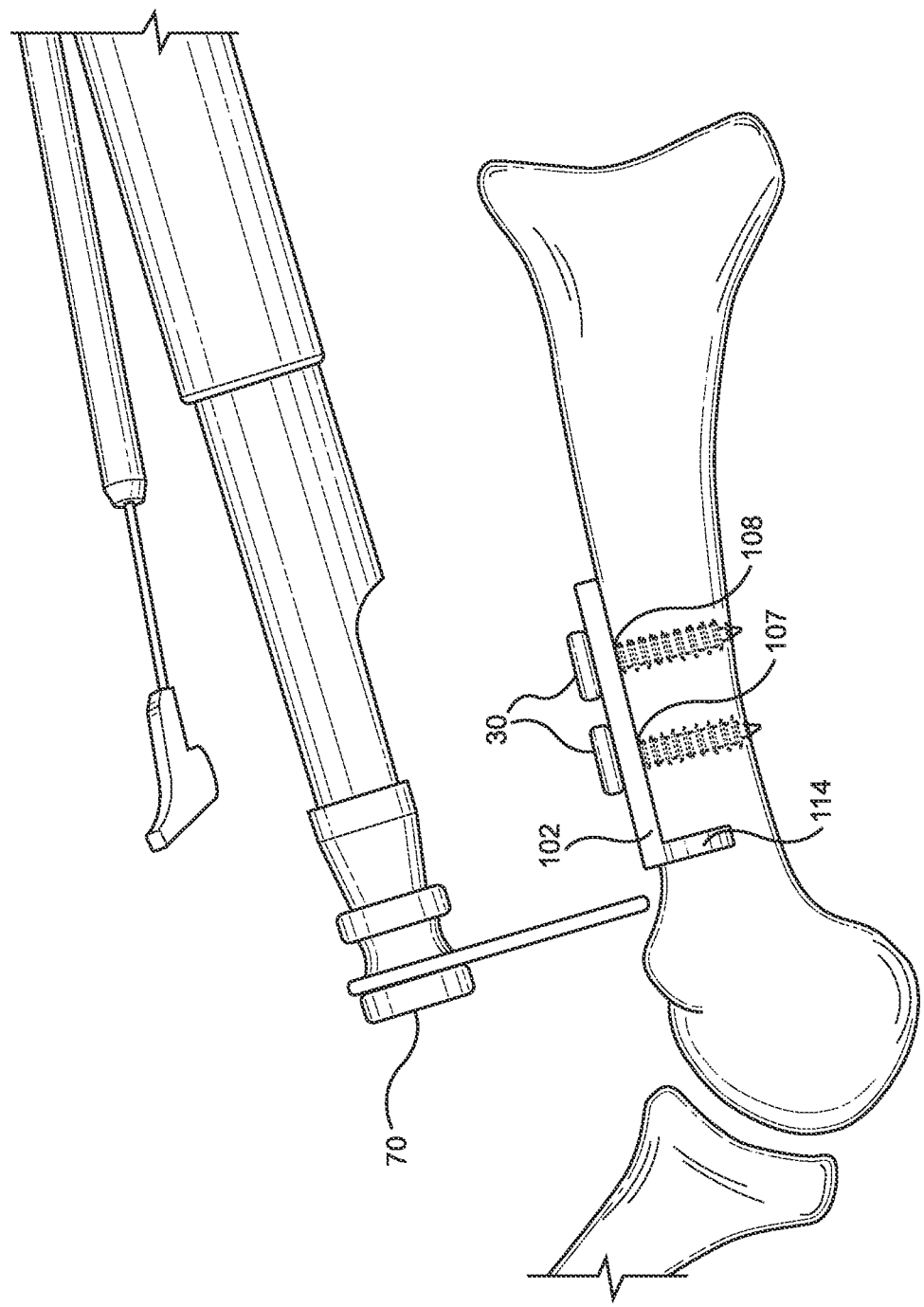
Figure 17:
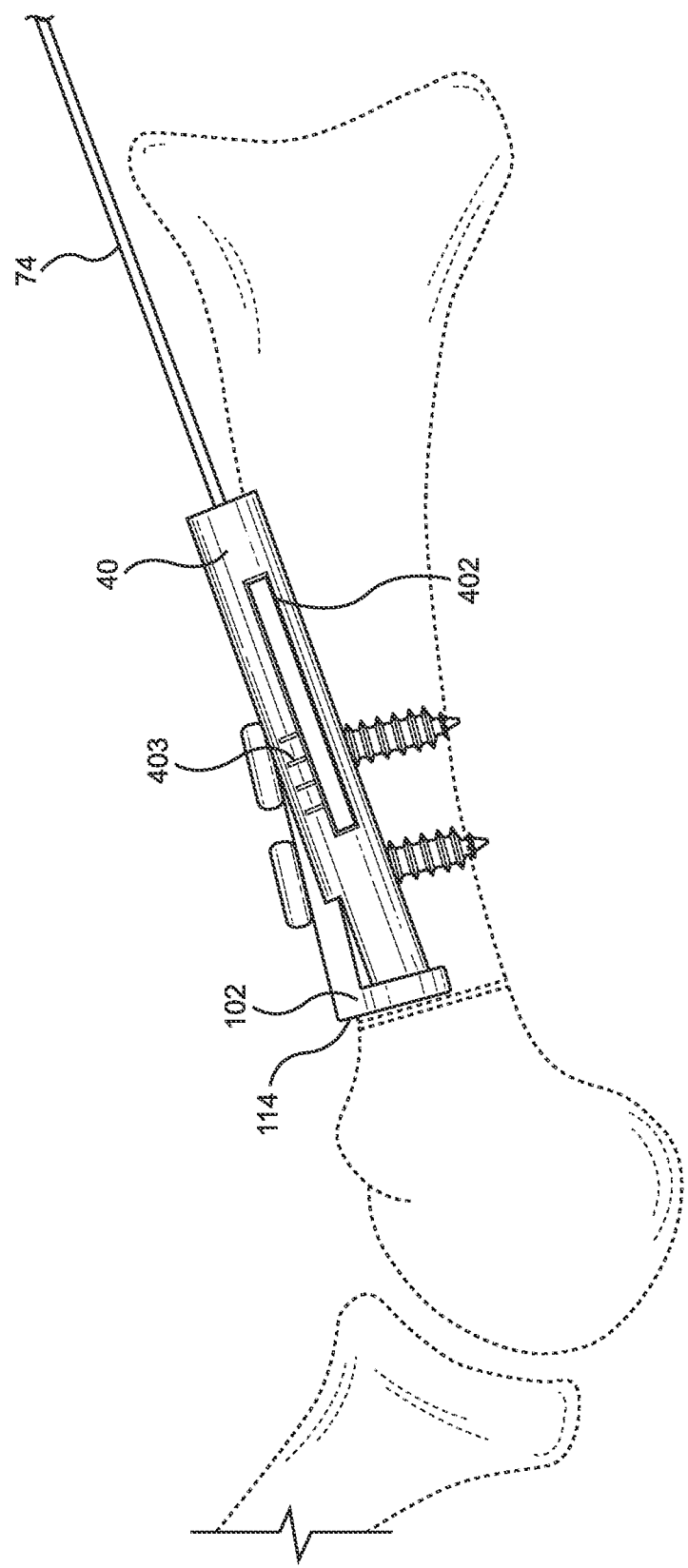
Figure 18:
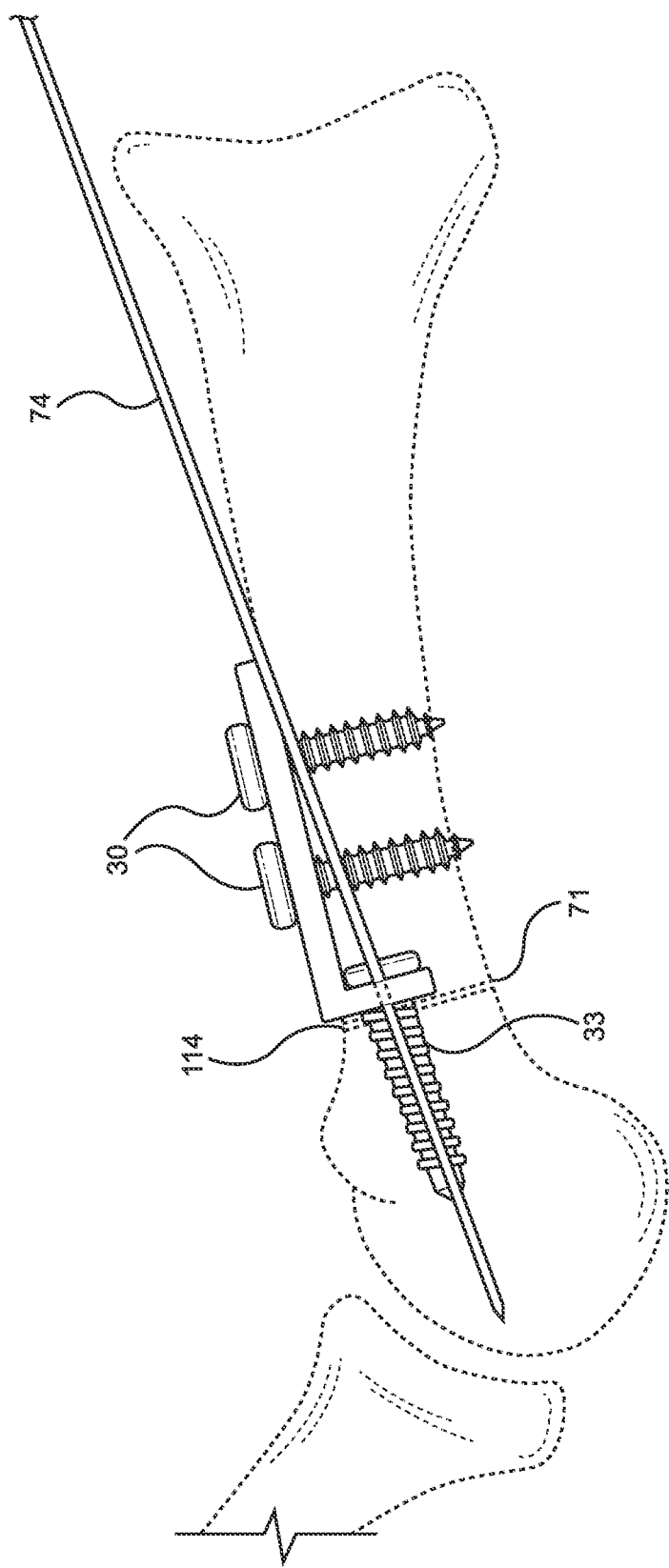

The above fixation device is used in the following steps as shown in FIGS. 15 to 18:
1. Dissect the neck of the metatarsal leaving periosteum intact;
2. As shown in FIG. 15, apply an appropriately sized and curved plate 102 of the fixation device 10 to the dorsum of the metatarsal with two parallel BB tacks 30;
3. X-ray to determine that the position of the plate 102 is appropriate and if not re-locate;
4. Remove the BB tack 50 from the hole 107 which is more proximal to the buttress plate and measure the length with the depth gauge 31. Insert the appropriate non-locking bicortical screw 30;
5. Repeat the step 4 with more distal non-locking screw hole 108.
6. Using the front surface 114 of the buttress plate 111 as a cutting guide, cut a transverse osteotomy through the neck of the metatarsal using a suitable cutting tool 70 thus forming a planar cutting line 71 across the rear of the bone head. The head is then relocated by sliding movement across the planar guide surface 114 using translational movement and/or rotational movement around the axis;
7. Apply the guide tube 40 to the threaded hole 117 in the buttress plate 111 using the threaded male end 401 so that the guide tube is aligned along the axis of the hole 117. The guide tube 40 has window 402 for a depth measuring guide wire 74 with laser line and a depth measurement gauge 403;
8. Insert the temporary fixation pin or wire 74 through the guide tube 40 into the repositioned metatarsal head on the surface 114;
9. X-ray to confirm the appropriate position and length of the pin of the guide wire and adjust as necessary;
10. Read the depth on the laser line of the temporary fixating pin on the guide tube;
11. Remove the guide tube leaving the guide wire in place;
12. Insert the inter-fragmental screw 33 along the guide wire through the hole 117 into the metatarsal head;
13. X-ray for final confirmation of satisfactory screw lengths and metatarsal head position.

The arrangement herein thus provides a method for osteotomy of a bone having an elongate bone length 2 and a bone head 3 at one end of the bone length 2 where the osteotomy is used to separate the bone head from the bone length at a division line, the method comprising:
  attaching to the elongate bone length by fasteners 50 an elongate plate portion 102 extending in a longitudinal direction along the bone length from a first end to be located remote from the bone head to a second end at the bone head;
  the elongate plate portion 102 having two side edges 103, 104, an upper surface 105 and a lower surface 106 engaging the bone length;
  locating a buttress portion 111 connected to the elongate plate portion 102 at the second end extending transverse to the elongate plate portion 102;
  the buttress portion having a front buttress surface 114 facing away from the elongate plate portion 102 and a rear surface 115 facing along the elongate plate portion 102;
  using the front buttress surface 114 as a guide, cutting through the bone to separate the bone length from the bone head;
  translating the bone head across the front buttress surface 114 to a required offset location of the bone head 3 relative to the bone length 2;
  and fastening the front buttress surface 114 of the buttress portion to the bone head at the required offset location.

As shown in FIG. 19, an appropriate holding paddle 60 is slipped over the BB tacks to hold the bones head in place in its relocated position after the cutting action. If rotation of the head of the bone is needed, a threaded push rod is inserted in the dorsum of the head 3 of the metatarsal or metacarpal to allow required controlled frontal plane rotation. A temporary fixating pin 61 is then inserted through one of the holes 62 in a holding paddle portion 63 of the paddle guide 60 into the metatarsal head. The overhanging medial bone ledge 67 can be removed with a bone saw.

The buttress plate 111 when fixated to the bone with the screws supplied, stabilizes the two bone components (head 3 to the shaft 2). The paddle holder helps hold the bones in place before fixating them. The various screw guides reduce human error.

A trained surgeon with excellent knowledge of metatarsal or metacarpal positional deformities and the associated anatomy will assemble the fixation device as trained or with a manufacturer representative's guidance.

The paddle holder may be optional in some situations.

Figure 1:
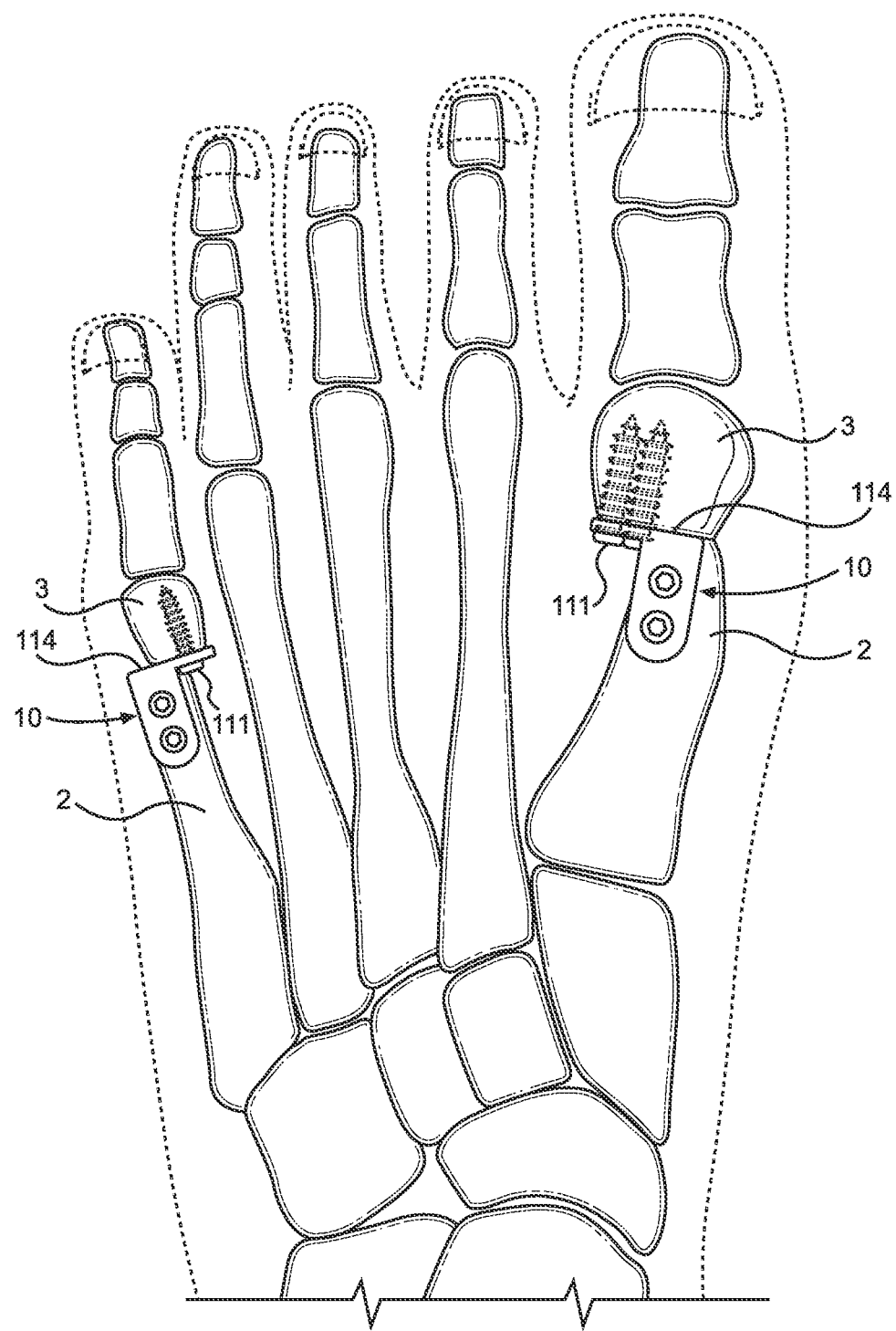
FIG. 1 is a plan view of a foot of a patient in which the fixation device according to the present invention is used with the method of the invention to provide a metatarsal osteotomy on two metatarsals.
Figure 14:
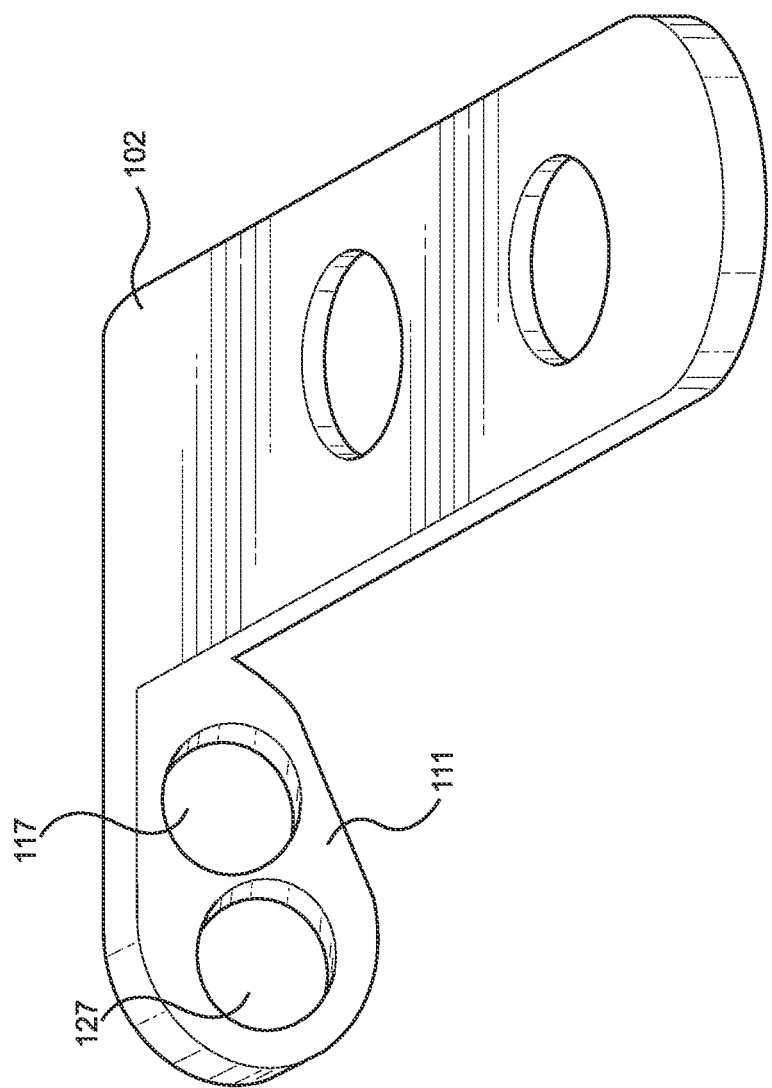

In an alternative arrangement shown in FIGS. 1, 2 and 14, the buttress portion 111 includes two holes 117 as before an additional hole 127 for increased stability and prevent rotation of the bone head.

In another alternative the elongate plate portion has a third hole adjacent the buttress portion which is inclined through the elongate plate portion toward the buttress portion.

That is the buttress plate, as described, may be modified for use with other long bones with angular deformities. The buttress plate may be configured with more than three screw holes. The screw hole near the smaller bone fragment being fixated might be angled to allow additional inter-fragmental compression as it extends into the bone head.

Figure 13:
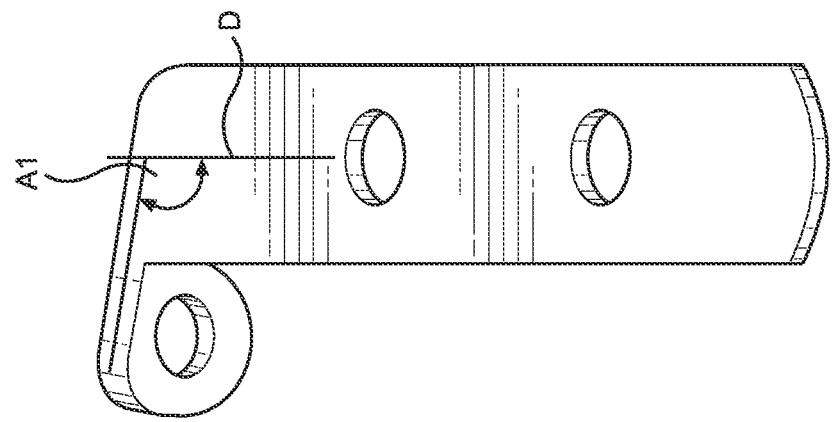
FIGS. 11, 12, 13 and 14 are isometric views of alternative embodiments of the fixation device.
Figure 12:
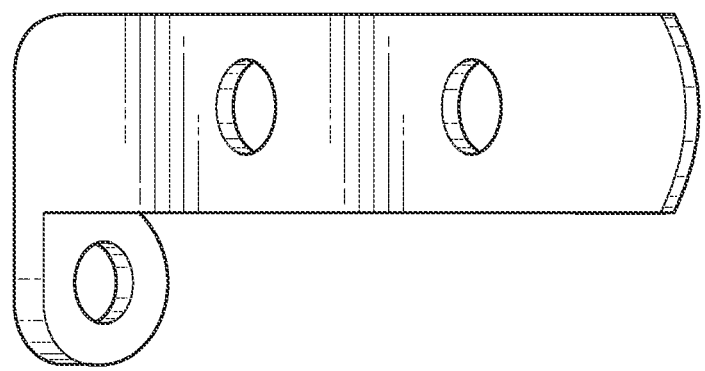
Figure 11:
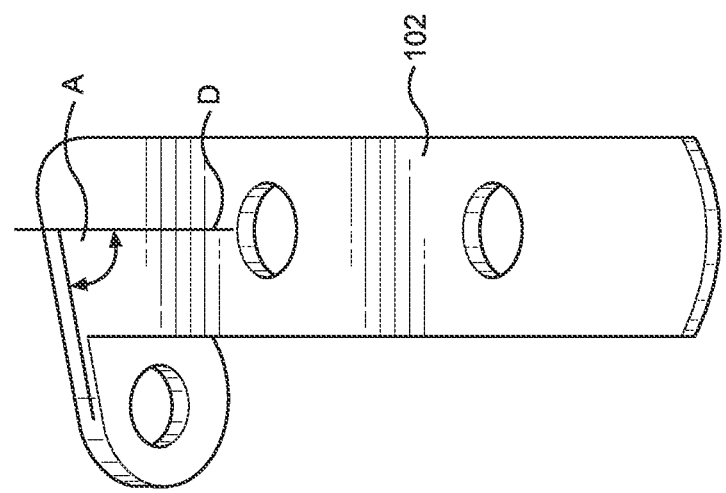

As shown by comparing FIGS. 11, 12 and 13, the front surface of the buttress portion can lie at different angles A and A1 to the longitudinal axis D of the plate portion. This acts to move the head longitudinally of the plate portion when translated either to increase the effective length of the bone or to reduce it or to maintain it constant as required.

The invention claimed is:

1. A fixation device for use in osteotomy of a bone having an elongate bone shank portion and a bone head at one end of the bone shank portion where the osteotomy is used to separate the bone head portion from the bone shank portion at a division line defining an osteotomy surface, the device comprising:
  a unitary member having:
    an elongate plate portion having two side edges, a first end, a second end, an upper surface and a lower surface where the first and second ends are spaced longitudinally along the elongate plate portion;
    at least first and second holes through the elongate plate portion from the upper surface to the lower surface and between the side edges where said at least first and second holes are spaced longitudinally along the elongate plate portion;
    the elongate plate portion being arranged for attachment of the lower surface to a top of the elongate bone shank portion so as to extend in a longitudinal direction along the bone shank portion from the first end to be located remote from the bone head portion to the second end to be located at the bone head portion;
    said at least first and second holes being arranged to receive fasteners passing through the elongate plate portion from the upper surface for fastening the lower surface of the elongate plate portion to the top of the elongate bone shank portion;
    a buttress portion connected to the elongate plate portion at the second end extending transverse to the elongate plate portion with a part of the buttress portion projecting outwardly beyond one side edge of the elongate plate portion and downwardly beyond the lower surface;
    the buttress portion having a front buttress surface facing away from the elongate plate portion and a rear surface facing along the elongate plate portion;
    at least one hole through the part of the buttress portion from the rear surface to the front buttress surface, said at least one hole being arranged to receive at least one fastener passing through the part of the buttress portion from the rear surface for fastening the front buttress surface of the buttress portion to the bone head portion after the osteotomy;

the front buttress surface lying transverse to the longitudinal direction and forming a front most surface of the unitary member by which the division line of the bone head portion is supported and located by the front buttress surface for translocation thereon.

2. The fixation device according to claim 1 wherein the front buttress surface is planar.

3. The fixation device according to claim 1 wherein the buttress portion is offset wholly to one side of the elongate plate portion so that it does not extend past the other side edge.

4. The fixation device according to claim 1 wherein the buttress portion is offset below the elongate plate portion so that it does not extend past the upper surface.

5. The fixation device according to claim 1 wherein the front buttress surface forms a flange of constant thickness in the longitudinal direction.

6. The fixation device according to claim 1 wherein the hole in the buttress portion is threaded to receive a male thread of a screw guide.

7. The fixation device according to claim 1 wherein the buttress portion includes two holes.

8. The fixation device according to claim 1 wherein elongate plate portion has a third hole adjacent the buttress portion which is inclined through the elongate plate portion toward the buttress portion.

9. A set of components for use in osteotomy of a bone having an elongate bone shank portion and a bone head portion at one end of the bone shank portion where the osteotomy is used to separate the bone head from the bone length at a division line, the set of components comprising:
a fixation device defining a unitary member comprising:
an elongate plate portion having two side edges, a front end, a rear end, an upper surface and a lower surface where the front and rear ends are spaced longitudinally along the elongate plate portion;
at least first and second holes through the elongate plate portion from the upper surface to the lower surface and between the side edges where said at least first and second holes are spaced longitudinally along the elongate plate portion;
the elongate plate portion being arranged for attachment of the lower surface to a top of the elongate bone shank portion so as to extend in a longitudinal direction along the bone shank portion from the rear end to be located remote from the bone head portion to the front end to be located at the bone head portion;
said at least first and second holes being arranged to receive fasteners passing through the elongate plate portion from the upper surface for fastening the lower surface of the elongate plate portion to the top of the elongate bone shank portion;
a buttress portion connected to the elongate plate portion at the front end extending transverse to the front end of the elongate plate portion with a part of the buttress portion projecting outwardly beyond one side edge of the elongate plate portion and downwardly beyond the lower surface;
the buttress portion having a front buttress surface facing away from the front end of the elongate plate portion and a rear surface facing along the elongate plate portion toward the rear end;
at least one hole through the part of the buttress portion from the rear surface to the front buttress surface, said at least one hole being arranged to receive at least one fastener passing through the part of the buttress portion from the rear surface for fastening the front buttress surface of the buttress portion to the bone head portion after the osteotomy;
the front buttress surface lying transverse to the longitudinal direction and forming a front most surface of the unitary member by which the division line of the bone head portion is supported and located by the front buttress surface for translocation thereon;
a plurality of screw fasteners for fastening the elongate plate portion to the bone shank portion;
a screw fastener for fastening the buttress portion to the bone head portion, the screw fastener including a central hole allowing the screw fastener to pass over a guide wire; and
a guide tube for engagement with the hole in the buttress portion to receive a guide wire therethrough.

10. The set of components according to claim 9 wherein the guide tube has a male thread for engaging into a female thread in the hole in the buttress portion.

11. The set of components according to claim 9 including a paddle holder having a mounting portion for attachment to the elongate plate portion and a blade portion with a plurality of adjustment holes for attachment of the blade portion to a side of the bone head for positioning of the bone head on the front buttress surface.

12. A method for osteotomy of a bone of a patient, the bone having an elongate bone shank portion and a bone head portion at one end of the bone shank portion where the osteotomy is used to separate the bone head portion from the bone shank portion at a division line, the method comprising:
providing a unitary member having:
an elongate plate portion having two side edges, a first end, a second end, an upper surface and a lower surface where the first and second ends are spaced longitudinally along the elongate plate portion;
at least first and second holes through the elongate plate portion from the upper surface to the lower surface and between the side edges where said at least first and second holes are spaced longitudinally along the elongate plate portion;
a buttress portion connected to the elongate plate portion at the second end extending transverse to the elongate plate portion with a part of the buttress portion projecting outwardly beyond one side edge of the elongate plate portion and downwardly beyond the lower surface;
the buttress portion having a front buttress surface facing away from the elongate plate portion and a rear surface facing along the elongate plate portion;
at least one hole through the part of the buttress portion from the rear surface to the front buttress surface, said at least one hole being arranged to receive at least one fastener passing through the part of the buttress portion from the rear surface;
the front buttress surface lying transverse to the longitudinal direction and forming a front most surface of the unitary member;
attaching the lower surface of the elongate plate portion to a top surface of the elongate bone shank portion of the bone by first and second fasteners passing through said first and second holes respectively so that the elongate plate portion extends in a longitudinal direction along the bone shank portion of the bone from the first end remote from the bone head portion to the second end at the bone head portion and so that the second fastener is spaced longitudinally along the elongate bone shank portion from the first fastener;

the buttress portion connected to the second end of the elongate plate portion thus extending transverse to the elongate plate portion and outwardly to one side of the elongate bone shank portion of the bone at the bone head portion;

using the front buttress surface as a guide, cutting through the bone to separate the elongate bone shank portion bone from the bone head portion;

translating the bone head portion across the front buttress surface to a required offset location of the bone head portion relative to the elongate bone shank portion;

and fastening the buttress portion to the bone head portion at the required offset location.

13. The method according to claim 12 wherein the front buttress surface is planar to guide the translating of the bone head portion.

14. The method according to claim 12 wherein the bone head portion is rotated about an axis longitudinal of the elongate bone shank portion bene while guided on the front buttress surface.

15. The method according to claim 12 including mounting a tubular screw guide in said at least one hole through the part of the buttress portion and guiding a fastening screw through the buttress portion on a guide wire to a required position in the bone head portion.

16. The method according to claim 12 including attaching a mounting portion of a paddle holder to the elongate plate portion and engaging a blade portion with a plurality of adjustment holes for attachment of the blade portion to a side of the bone head portion so as to provide positioning of the bone head portion on the front buttress surface.

17. The method according to claim 12 wherein the buttress portion on the side of the elongate plate prevents the bone head portion from swiveling and allows for an easy method of temporarily and then permanently fixating the bone head portion.

* * * * *